United States Patent
Yang et al.

(10) Patent No.: US 7,424,077 B2
(45) Date of Patent: Sep. 9, 2008

(54) **JITTER SENSITIVE MAXIMUM-*A-POSTERIORI* SEQUENCE DETECTION**

(75) Inventors: Xueshi Yang, Pittsburgh, PA (US);
Erozan Mehmet Kurtas, Pittsburgh, PA (US); Rohit Negi, Pittsburgh, PA (US);
Xun Zhang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 594 days.

(21) Appl. No.: 11/105,008

(22) Filed: Apr. 13, 2005

(65) Prior Publication Data

US 2006/0233287 A1 Oct. 19, 2006

(51) Int. Cl.
*H04L 7/02* (2006.01)
(52) U.S. Cl. .................. 375/360; 375/266; 375/371; 375/342; 714/704; 386/116
(58) Field of Classification Search .......... 375/341, 375/371, 342, 347, 316, 224, 376; 714/704, 714/782; 398/141; 386/116
See application file for complete search history.

(56) References Cited

U.S. PATENT DOCUMENTS

| | | | | |
|---|---|---|---|---|
| 4,197,502 A | * | 4/1980 | Sumner et al. | 375/316 |
| 4,745,625 A | * | 5/1988 | Eyuboglu | 375/316 |
| 5,220,568 A | * | 6/1993 | Howe et al. | 714/782 |
| 5,689,532 A | * | 11/1997 | Fitzpatrick | 375/341 |
| 5,768,285 A | * | 6/1998 | Griep et al. | 714/704 |
| 5,862,192 A | * | 1/1999 | Huszar et al. | 375/347 |
| 6,201,839 B1 | * | 3/2001 | Kavcic et al. | 375/341 |
| 6,438,180 B1 | * | 8/2002 | Kavcic et al. | 375/341 |
| 6,532,337 B1 | * | 3/2003 | Yoshinaka | 386/116 |
| 6,985,552 B1 | * | 1/2006 | King | 375/376 |
| 7,154,965 B2 | * | 12/2006 | Zeng et al. | 375/340 |
| 7,319,726 B1 | * | 1/2008 | Wu et al. | 375/342 |
| 2004/0264618 A1 | * | 12/2004 | Zogakis | 375/371 |

(Continued)

OTHER PUBLICATIONS

Moision, B. & Siegel, P.H.; "Distance Enhancing Constraints for Noise Predictive Maximum Likelihood Detectors," Global Telecommunications Conference 1998, Globecom '98. vol. 5, pp. 2730-2735.

(Continued)

*Primary Examiner*—Chieh M. Fan
*Assistant Examiner*—Sudhanshu C. Pathak
(74) *Attorney, Agent, or Firm*—Westman, Champlin & Kelly P.A.

(57) ABSTRACT

A channel detector has an anchor points inserter, a desired signal calculator, a distance calculator and a data detector. The anchor points inserter is adapted to choose values of expected transition locations for transition shifts within a received signal and to insert anchor points corresponding to the chosen values within a bit detection interval. The desired signal calculator is coupled to the anchor points inserter and is adapted to estimate desired signals corresponding to transition location information from the anchor points inserter. The distance calculator is coupled to the desired signal calculator and is adapted to generate a distance calculator output based on distances between the received signal and each of the desired signals. The data detector is coupled to the distance calculator and is adapted to identify a bit sequence corresponding to a desired signal having a minimum distance from the received signal. The data detector is adapted to generate an output based on the distance calculator output.

20 Claims, 8 Drawing Sheets

U.S. PATENT DOCUMENTS

2005/0069031 A1* 3/2005 Sunter et al. ............... 375/224
2006/0285852 A1* 12/2006 Xi et al. .................... 398/141

OTHER PUBLICATIONS

Oenning, T. & Moon, J.; "Low Density Parity Check Coding for Magnetic Recording Channels with Media Noise," IEEE International Conference on Communications, 2001, vol. 7, pp. 2189-2193.

Eleftheriou, E. & Hirt, W.; "Improving Performance of PRML/EPRML through Noise Prediction," IEEE Transactions on Magnetics, vol. 32, No. 5, Sep. 1996, pp. 3968-3970.

Moon, J. & Zeng, W. "Equalization for Maximum Likelihood Detectors," IEEE Transactions on Magnetics, vol. 31, No. 2, Mar. 1995, pp. 1083-1088.

Moon, J.; "Pattern-Dependent Noise Prediction in Signal-Dependent Noise," IEEE Journal on Selected Areas in Communications, vol. 19, No. 4, Apr. 2001, pp. 730-743.

M. Jin et al.; "A Novel Fast Approach for Estimating Error Propagation in Decision Feedback Detectors," IEEE Journal on Selected Areas in Communications, vol. 19, No. 4, Apr. 2001, pp. 668-676.

Kim, Y. & Moon, J.; "Noise-Predictive Maximum-Likelihood Method Combined with Infinite Impulse Response Equalization," IEEE Transactions on Magnetics, vol. 35, No. 6, Nov. 1999, pp. 4538-4543.

Kavcic, A. & Moura, J. "The Viterbi Algorithm and Markov Noise Memory," IEEE Transactions on Information Theory, vol. 46, No. 1, Jan. 2000, pp. 291-301.

J. Coker et al.; "Noise-Predictive Maximum Likelihood (NPML) Detection," IEEE Transactions on Magnetics, vol. 34, No. 1, Jan. 1998, pp. 110-117.

R. Cideciyan et al.; "Noise Predictive Maximum Likelihood Detection Combined with Parity-Based Post-Processing," IEEE Transactions on Magnetics, vol. 37, No. 2, Mar. 2001, pp. 714-720.

Liu, J. & Vijaya Kumar, B.V.K.; "Symbol Timing Recovery for Low-SNR Partial Response Recording Channels," Global Telecommunications Conference, Nov. 2002, Globecom, 2002, vol. 2, pp. 1129-1136.

* cited by examiner

JITTER SENSITIVE MAXIMUM-*A-POSTERIORI* SEQUENCE DETECTION

FIELD OF THE INVENTION

The present invention relates to bit sequence detection in information channels, and more particularly, to systems and methods for sequence detection in communication channels when the transition jitter of the information signal constitutes a dominant noise source.

BACKGROUND OF THE INVENTION

In communication channels, and particularly in magnetic recording channels, a Viterbi algorithm is often used for sequence detection in channel detectors due to the presence of inter-symbol interference (ISI). The term "inter-symbol interference" refers to the scenario when the signal pulses or symbols spread into adjacent pulses or symbols in a time domain. The Viterbi algorithm is a maximum likelihood detection algorithm, and it is optimal when additive white Gaussian noise constitutes the only noise source.

In practical recording channels, however, transition jitter noise is one of the primary impediments to reliable data recovery, particularly for ultra-high linear density recording. Transition jitter noise refers to random shifts of individual transition boundaries between different magnetization states in the recording media relative to an expected transition location within a bit interval of a channel detector.

Channel detectors typically lack a-priori knowledge of the random shifts. Consequently, the channel detectors assume that bit transitions occur in a nominal location. Mismatches between the read back signal and the assumed bit transition locations give rise to the jitter noise. Since jitter noise is random, conventional detectors cannot easily be tuned to the exact random shift.

Traditional partial response maximum likelihood (PRML) detectors ignore the nature of jitter noise, and treat jitter noise in the same way as additive white Gaussian noise, resulting in significant performance loss. Transition jitter is typically both correlated and data dependent. Treating the jitter noise as additive noise, it is possible to model the combination of jitter and electronic noise with an auto-regressive model, such that the correlation structure (deemed data dependent) can be taken into account in the branch metric calculation using a trellis survivor path competition. The success of this method depends on how close the auto-regressive model can approximate the actual jitter/electronics noise. However, since the noise resulting from the transition jitter is not strictly an auto-regressive (or Markov) process, modeling the jitter noise using a finite order Markov model is less than desirable.

There is an ongoing need in the art for improved channel detection systems and methods in the presence of transition jitter noise. Embodiments of the present invention address these problems and provide advantages over existing systems.

SUMMARY OF THE INVENTION

A channel detector has an anchor points inserter, a desired signal calculator, a distance calculator and a data detector. The anchor points inserter is adapted to choose values of expected transition locations for transition shifts within a received signal and to insert anchor points corresponding to the chosen values within a bit detection interval. The desired signal calculator is coupled to the anchor points inserter and is adapted to estimate desired signals corresponding to jitter information from the anchor points inserter. The distance calculator is coupled to the desired signal calculator and is adapted to generate a distance calculator output based on distances between the received signal and each of the desired signals. The data detector is coupled to the distance calculator and is adapted to identify a bit sequence corresponding to a desired signal having a minimum distance from the received signal. The data detector is adapted to generate an output based on the distance calculator output. In one embodiment, the output of the data detector is a soft information output generated by the data detector using a maximum-likelihood algorithm or a maximum a-posteriori probability algorithm.

In one embodiment, a method for detecting a signal from a channel with jitter noise is provided. Anchor points are inserted into a bit detection interval using an anchor points inserter. Transition responses from the channel corresponding to the inserted anchor points are calculated using a transition response calculator. Possible bit sequences having a length up to a number of data bits to be detected from the channel are generated using a bit sequence generator. Nominal signals are calculated with a desired signal calculator. The nominal signals correspond to jitter information from the anchor points inserter, calculated transition responses from the transition response calculator, and the possible bit sequences from the bit sequence generator. An output bit sequence is detected based on a nominal signal that has a minimum distance from a signal received from the channel using a data detector. A reliability information of the output bit sequence is generated based on the output of the distance calculator.

In another embodiment, a channel detector has an anchor points inserter, a bit sequence generator, a signal calculator, and a data detector. The anchor points inserter is adapted to insert anchor points into a bit detection interval. The anchor points correspond to values of expected transition locations for transitions within received signals. The bit sequence generator is adapted to generate possible bit sequences having a length corresponding to a number of bits to be detected. The signal calculator is coupled to the anchor points inserter and to the bit sequence generator. The signal calculator is adapted to calculate nominal signals based on the possible bit sequences and on information from the anchor points inserter. The data detector is coupled to a channel and adapted to receive a signal. The data detector is adapted to generate a soft reliability information output based on the received signal using a maximum-likelihood or a maximum a-posteriori probability algorithm.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
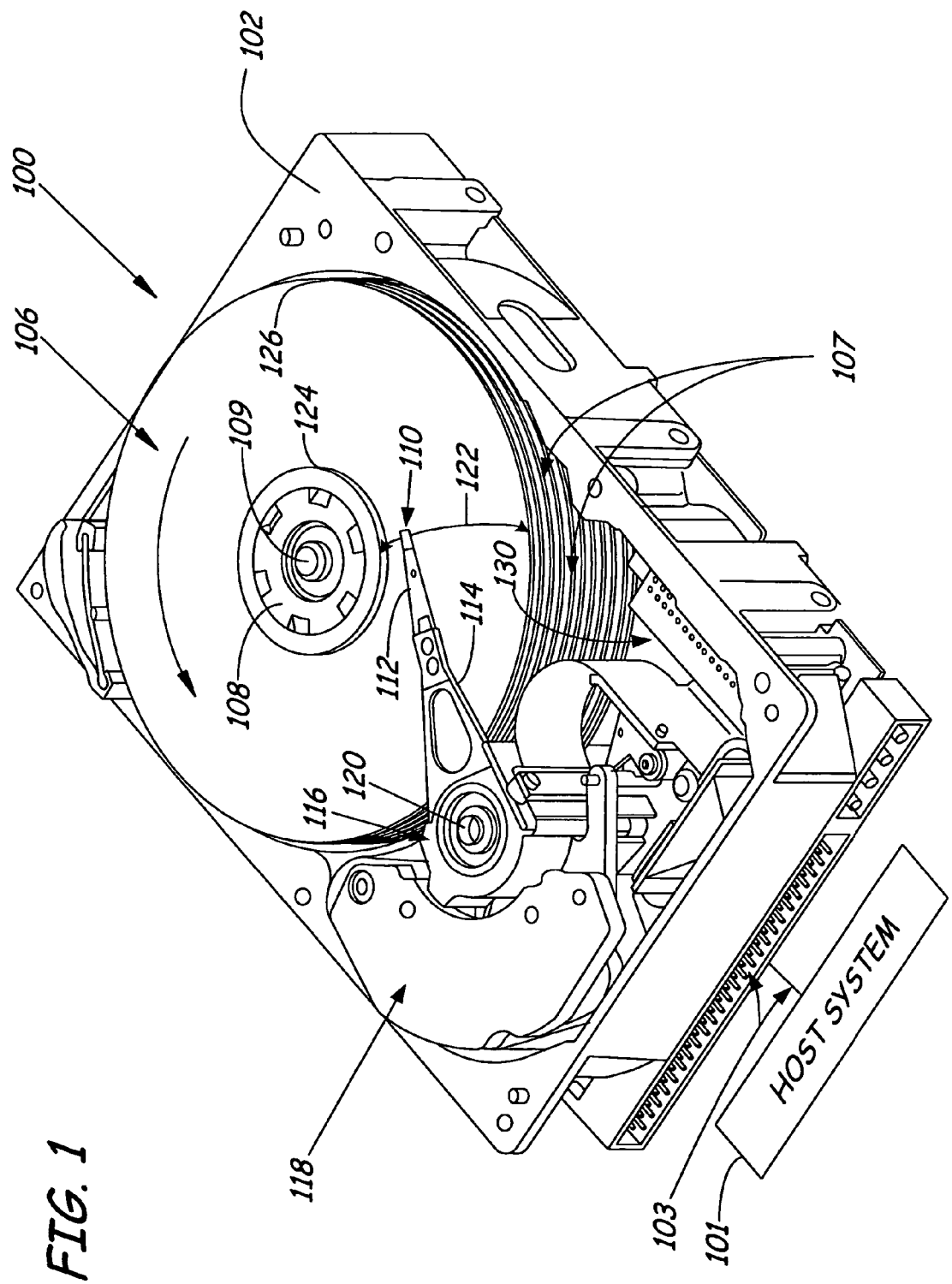
FIG. 1 is an isometric view of a disc drive on which embodiments of the present invention may be employed.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110 to which a read/write transducer (not shown) is mounted, for communication with the disc surface.

In the example shown in FIG. 1, disc head sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached disc head sliders 110 (and associated read/write transducers) about a pivot shaft 120 to position the disc head slider 110 over a desired data track along an arcuate path 122 between a disc inner diameter 124 and a disc outer diameter 126. Voice coil motor 118 is driven by electronics 130 based on signals generated by heads 110 and a host system 101. The host system 101 is coupled to the disc drive 100 via an interface 103. Data and control signals pass from the host system 101 to the disc drive 100 over the interface 103.

It should be understood by workers skilled in the art that the disc drive 100 is only one of many devices in which embodiments of the present invention are useful. Generally, the present invention can be used in any device that detects data on a communications channel, particularly where jitter noise is present. The present invention can be used in any type of storage device, including read only memory (ROM), programmable read only memory (PROM), erasable programmable read only memory (EPROM), electrically erasable programmable read only memory (EEPROM), flash memory, and the like. Additionally, the present invention can be used in any type of communications device.

The present invention uses information about the a-priori distribution of the random jitter noise to reduce the mismatch between the detector and the received signal. The present invention utilizes anchor points to subdivide a data detection interval and to identify a received bit sequence by selecting a bit sequence representative of a computed nominal signal that is closest to the received signal. Based on the distance between the received signal and the nominal signal, the system generates associated reliability information (soft outputs) of the output bit sequence.

Figure 2A:
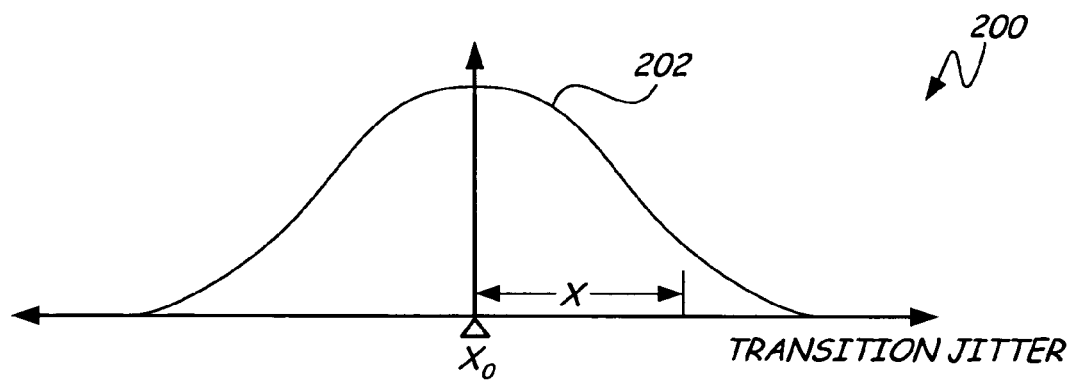
FIG. 2A is a simplified graph illustrating potential transition jitter relative to an assumed anchor point.

FIG. 2A illustrates a graph 200 of a probability density function (PDF) 202 of random transition shifts contained in a noisy received signal, for example, by a channel detector. The PDF 202 is centered on an anchor point $X_0$, which represents a nominal, expected location for the transitions. The random transition jitter X represents the difference of the actual transition shift from the anchor point $X_0$.

Figure 2B:
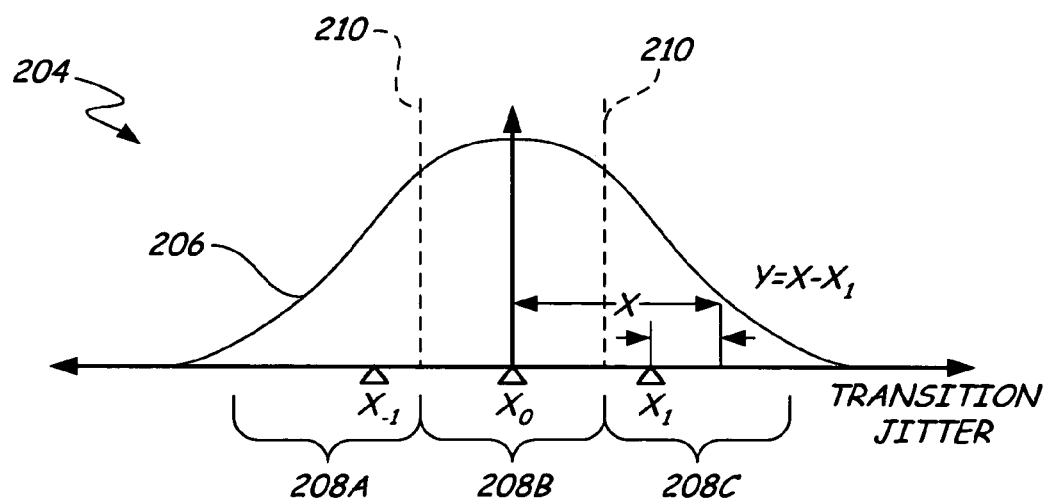
FIG. 2B is a simplified diagram illustrating a reduced transition jitter as additional anchor points are inserted.

FIG. 2B illustrates a graph 204 of a PDF of random transition shifts contained in a noisy received signal, for example, by a channel detector. The PDF 206 is once again centered on an anchor point $X_0$; however, two additional anchor points ($X_{-1}$ and $X_1$) have been added, subdividing the interval into sub-intervals or regions 208A, 208B, and 208C within the bit interval. The random transition shift is classified into the region 208 that contains the anchor point (in this instance, it is the region 208C containing anchor point $X_1$) having the closest distance to the actual random shift. The classification boundaries are shown as phantom lines 210.

The mismatch between the anchor point and the actual transition shift becomes Y instead of X The "transformed" transition jitter Y represents the difference between the actual value X of the random shift and the position of the closest anchor point ($X_1$, in this instance). Consequently, the variance of the jitter perceived by the detector is reduced, implying that the mismatch between the nominal assumption (represented by anchor point $X_0$) of the channel detector and the signal is decreased. By utilizing the additional anchor points to subdivide the interval, the jitter noise is reduced, resulting in a performance improvement.

In one embodiment, the anchor points are inserted into the bit interval to subdivide the bit interval into equal-sized time increments or equal-sized smaller intervals. In another preferred embodiment, some a-priori information about the transition jitter may be known, and the overall performance may be enhanced by insertion of anchor points to subdivide the bit interval into smaller intervals of different sizes.

The above description can be systematically formulated as follows. In recording channels, the readback signal can be modeled by a linear superposition model as follows:

$$r(t) = \sum_k \frac{(a_k - a_{k-1})}{2} h(t - kT - \Delta_k) + e(t), \quad \text{(Equation 1)}$$

where $\{a_k\}$ represents the encoder user bits (+1 or −1), h(t) represents the transition response of the channel, T is the bit interval, and e(t) is the electronics noise, which is assumed to be additive white Gaussian noise (AWGN). In Equation 1, the term $\Delta_k$ represents the transition jitter, which can be modeled as a truncated zero-mean Gaussian random variable (i.e., $|\Delta_k|<T/2$) with standard deviation ($\sigma_J$) expressed as a percentage of bit interval T. The truncation of T/2 is used to avoid a scenario where the next transition happens before the current transition.

The noise seen by the detector, besides the electronics noise e(t) can be directly related to jitter $\Delta_k$ as $$n_k(t) = h(t-kT) - h(t-kT-\Delta_k) \quad \text{(Equation 2)}$$

for the k–th transition (where k is an integer number). It is assumed there is a transition for the k–th bit interval. For an identically independent distributed (i.i.d) random bit sequence, average transition noise power due to transition jitter is given as follows:

$$\text{Average transition noise power} = \frac{M_0}{2T} \quad \text{(Equation 3)}$$

where $M_0$ is defined as $$M_0 \triangleq \int_{-\infty}^{\infty} E\{[h(t)-h(t-\Delta_k)]^2\}dt. \quad \text{(Equation 4)}$$

The average noise power is directly related to the distribution of the transition jitter $\Delta_k$. If the transition jitter $\Delta_k$ is assumed to be zero-mean Gaussian, the noise variance is completely determined by the variance of the transition jitter $\Delta_k$.

If the channel detector becomes jitter sensitive, the addition of anchor points for transition jitter can reduce the resulting jitter noise power. For the sake of simplicity, let us assume there are three anchor points, $-x$, 0 and $x$, respectively (corresponding to anchor points $X_{-1}$, $X_0$, $X_1$ in FIG. 2B, for example). In this instance, $x$ is assumed to be a positive real number. The detector assumes the desired transition location can be at $-x$, 0 or $x$ for any isolated transition. In this instance, the average noise power defined by Equation 4 translates into the following:

$$M_0' \triangleq \int_{-\infty}^{\infty} dt\, E\{[h(t-x)-h(t-\Delta_k)]^2 | \Delta_k > x/2\} P(\Delta_k > x/2)$$

$$+ E\{[h(t)-h(t-\Delta_k)]^2 | |\Delta_k| < x/2\} P(|\Delta_k| < x/2)$$

$$+ E\{[h(t+x)-h(t-\Delta_k)]^2 | \Delta_k < -x/2\} P(\Delta_k < -x/2) \quad \text{(Equation 5)}$$

Consequently, the noise power is reduced by the addition of the anchor points, such that the following expression is true:

$$M_0' \leq M_0. \quad \text{(Equation 6)}$$

In other words, the introduction of the anchor points reduces the jitter noise seen by the channel detector.

By increasing the number of anchor points for the transition jitter, the noise observed by the detector can be reduced even further. In fact, the jitter noise approaches zero as the number anchor points are increased. However, for sequence detection, the overall performance of the channel detector is determined by both the noise and the signal properties (in particular the minimum distance at moderate to high SNR). While increasing the number of anchor points reduces the noise power, the additional anchor points force the channel detector to distinguish between transition signals that are closer to each other, which implies smaller minimum distances and, hence, performance degradation. Therefore, there is a relationship between the number of anchor points and the overall performance of the channel detector, and the number of anchor points needs to be carefully chosen. In one embodiment, the number of anchor points can be set dynamically using an iterative process. For example, the classifications or regions formed by the anchor points can be subdivided by adding additional anchor points. Channel detection can then be performed with the new anchor points in an iterative tuning process until the channel detector reaches a desired level of accuracy. Alternatively, the number of anchor points can be predetermined and/or manually set.

The determination of the number of anchor points may vary based on a number of signal parameters and based on the channel. For the purpose of the following discussion, the number of anchor points is arbitrarily chosen to be three, in part, to confine the complexity and to simplify the discussion.

For recording channels, in order to reduce the complexity of the detector without incurring significant performance loss, readback signals are often equalized to a target prior to data detection. The equalization target can be obtained through different criteria. Assuming that the equalizer shapes the channel transition response from h(t) to g(t) and that the equalizer is a linear time-invariant transversal equalizer, if the input signal to the equalizer is shifted by an amount of jitter $\Delta$, the equalized transition response also shifts by the amount of jitter $\Delta$.

Generally, the shaped channel transition response g(t) can be detected using a maximum a-posteriori sequence detector. The maximum a-posteriori sequence detection finds the data bit sequence $\underline{a} \triangleq a_0, a_1, \ldots, a_n$ and anchor point sequence $\underline{j} \triangleq j_0, j_1, \ldots, j_n$ such that the a-posteriori probability is maximized given the received signal $\underline{s} \triangleq s_0, s_1, \ldots, s_n$. This maximization can be understood from the following equation:

$$\underline{a}, \underline{j} = \underset{\underline{a},\underline{j}}{\arg\max}\, P\{\underline{a}, \underline{j} | \underline{s}\} \quad \text{(Equation 7)}$$

In Equation 7, variable $\underline{j}$ takes a value in the set of anchor points $\{-x_m, \ldots, -x_1, x_0, x_1, \ldots, x_m\}$ with associated probability $\{P_{-m}, \ldots, P_{-1}, P_0, P_1, \ldots, P_m\}$, respectively. It is also assumed that the anchor points are symmetric around zero, such that $x_0 = 0$ and $0 < x_1 < x_2 < \ldots < x_m$. Consequently, it can be understood that $$P_{-m} = \int_{-T/2}^{-(x_m+x_{m-1})/2} q(y)dy, \quad \text{(Equation 8)}$$

$$P_{-(m-1)} = \int_{-(x_m+x_{m-1})/2}^{-(x_{m-1}+x_{m-2})/2} q(y)dy, \quad \text{(Equation 9)}$$

where q(y) is the probability density function of the transition jitter $\Delta_k$, and the sum of the probabilities over the range of probabilities is one, as shown in Equation 10, below.

$$P_{-m} + \ldots + P_0 + \ldots + P_m = 1. \quad \text{(Equation 10)}$$

Positive integer m determines the total number of anchor points to be 2m+1. By assuming the data bits are equally probable and by associating the anchor points with corresponding a-priori probabilities according to the distribution of transition jitter, Equation 7 can be rewritten as follows:

$$\underline{a}, \underline{j} = \underset{\underline{a},\underline{j}}{\arg\max}\, \frac{P\{\underline{s} | \underline{a}, \underline{j}\} P\{\underline{a}\} P\{\underline{j} | \underline{a}\}}{P\{\underline{s}\}} \quad \text{(Equation 11)}$$

Since the channel detector lacks a-priori information about $P\{\underline{a}\}$ and since $P\{\underline{s}\}$ is constant, Equation 11 can be simplified as follows:

$$\underline{a}, \underline{j} = \underset{\underline{a},\underline{j}}{\arg\max}\, P\{\underline{s} | \underline{a}, \underline{j}\} P\{\underline{j} | \underline{a}\} \quad \text{(Equation 12)}$$

In magnetic recording, the actual transition jitter $\Delta_k$ is typically correlated (time-wise). In other words, transition jitter $\Delta_k$ is influenced by all of the neighboring bits in the bit sequence. This correlation leads to complex expressions for optimal detection algorithms. The following discussion proceeds with the assumption that the transition jitter $(\Delta_k)$ is correlated only to bits $a_k$ and $a_{k-1}$. Thus, if bit $a_k$ differs from bit $a_{k-1}$, the detector has identified a transition, and the jitter noise $\Delta_k$ is a prescribed random variable. Otherwise, if bit $a_k$ and bit $a_{k-1}$ are the same (both have a value=1, for example), the jitter noise $\Delta_k$ is zero with probability of one (meaning 100 percent probability) since there is no transition. Consequently, if $a_{k-1} \neq a_k$, for $P\{j_k | \underline{a}\}$, then the probability can be expressed as follows:

$$P\{j_k=x_i|\underline{a}\}=P_i, i=-m, \ldots, m, \text{if } a_{k-1} \neq a_k. \quad \text{(Equation 13)}$$

If $a_{k-1=ak}$, the probability can be expressed as follows:

$$P\{j_k = x_i | \underline{a}\} = \begin{cases} 1 & \text{if } i = 0, \\ 0 & \text{if } 1 \neq 0 \end{cases}. \quad \text{(Equation 14)}$$

A jitter-sensitive maximum a-posteriori (JS-MAP) detector can be implemented using the Viterbi algorithm with the following modifications. First, the trellis of the Viterbi algorithm is constructed in such a way that the anchor points for the transition jitter along with the information bits constitute the state information. Second, the a-priori information of $P(j|\underline{a})$, $P(\underline{a})$ (if any) and the Euclidian distance between the received noisy signal and the desired signal are used for the branch metric calculation.

To accommodate both the bits and anchor points in the state information, the Viterbi trellis needs to be expanded. Depending on the bit information, the anchor point value can be either only zero (no transition) or take any of the values in the entire set of anchor points.

Figure 3A:
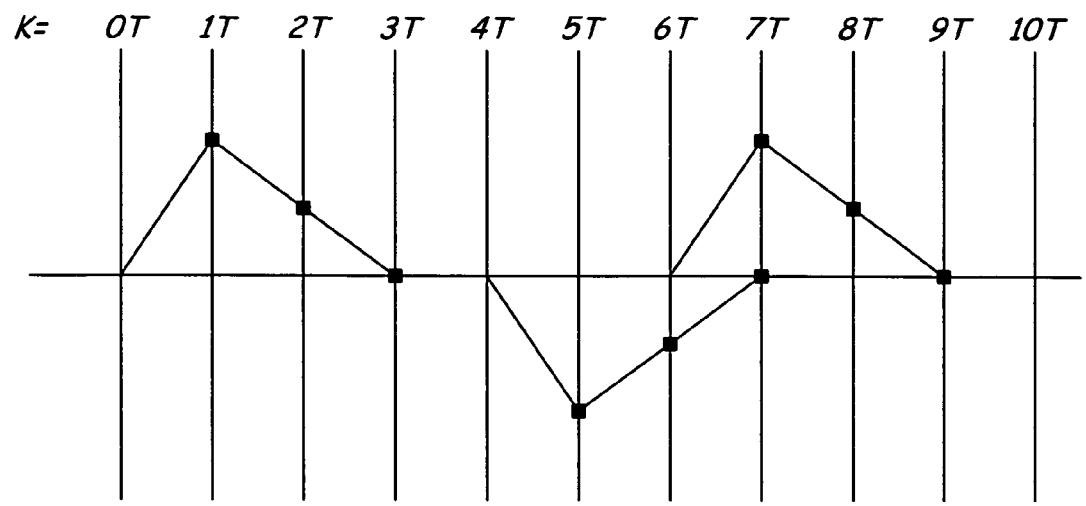
FIG. 3A is a simplified timing diagram of a series of transition pulses without jitter.
Figure 3B:
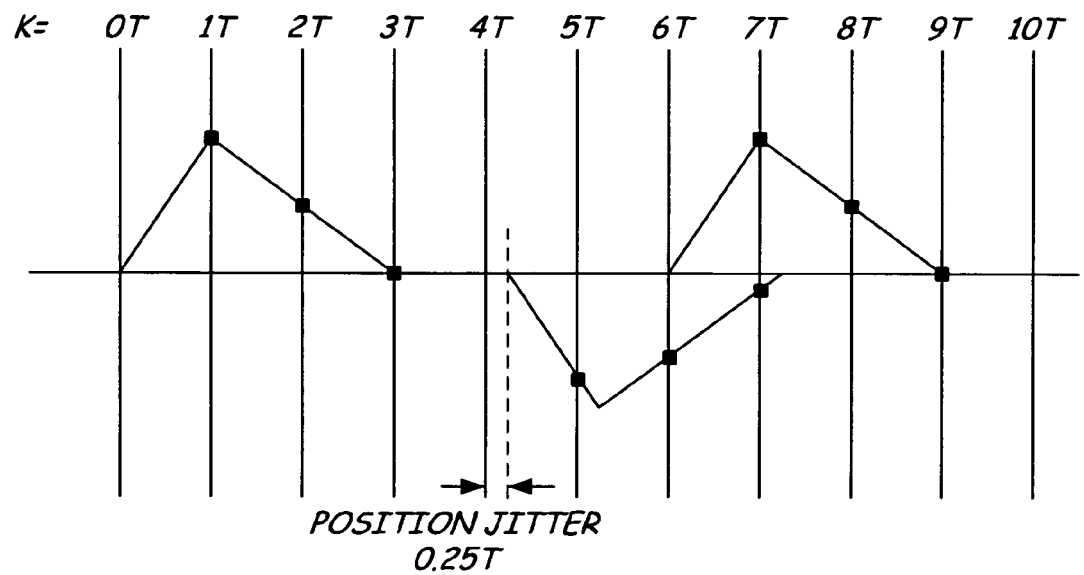
FIG. 3B is a simplified timing diagram of a series of transition pulses with a position jitter of approximately 0.25T, where T represents a sampling interval, according to an embodiment of the present invention.

FIGS. 3A and 3B illustrates an example where the equalized transition response g(t) is in a triangular form according to an embodiment of the present invention. In FIG. 3A, the bit interval is indexed by k, and the signal illustrates an idealized case where there is no transition jitter. The transition edges (the bit boundaries) terminate on the bit interval lines. For example, the second bit in the sequence begins at bit interval index K=4T, has a peak value at bit interval k=5T, and terminates on bit interval K=7T, where T represents a bit interval.

The Viterbi algorithm only needs to know the sampling values g(0),g(T),g(2T), . . . g(nT) of each transition response at the bit boundaries (as indicated by the squares where the signal line intersects a bit index line). The Viterbi algorithm then finds the bit sequence (a) such that the resulting signal is closest to the received noisy signal in terms of Euclidian distance. The term "Euclidian distance" refers to the distance between two points in Euclidian space, which refers to a physical space with dimensions that are orthogonal to each other (they are all at right angles to each other).

As shown in FIG. 3B, a jitter-sensitive detector assumes that the transition shift can happen at either at the desired location or with a delay of T/4. The overall signal is computed by superimposing all the contributions from the individual transition responses at different bit intervals. To calculate the desired signal, the intermediate values, such as g(-T/4),g(3T/4),g(7/4T) . . . g(n/4T), of the transition response are determined. The Viterbi algorithm then finds a combination of the bit sequence (a) and a sequence of anchor points (j) that gives rise to a nominal signal that is closest to the received signal.

In practice, a channel is often specified by a baud-rate target, such as a partial response (PR) target, for example, PR2 [1 2 1]. The transition response of the channel can be deduced from the baud-rate target, and subsequently interpolation can be used to obtain the intermediate values of the transition response.

In trellis representation, the state is comprised of memory cells for the bits (the bit state) and for the sequence of anchor points (the jitter state). Depending on the implementation, a variety of structures are possible.

Figure 4:
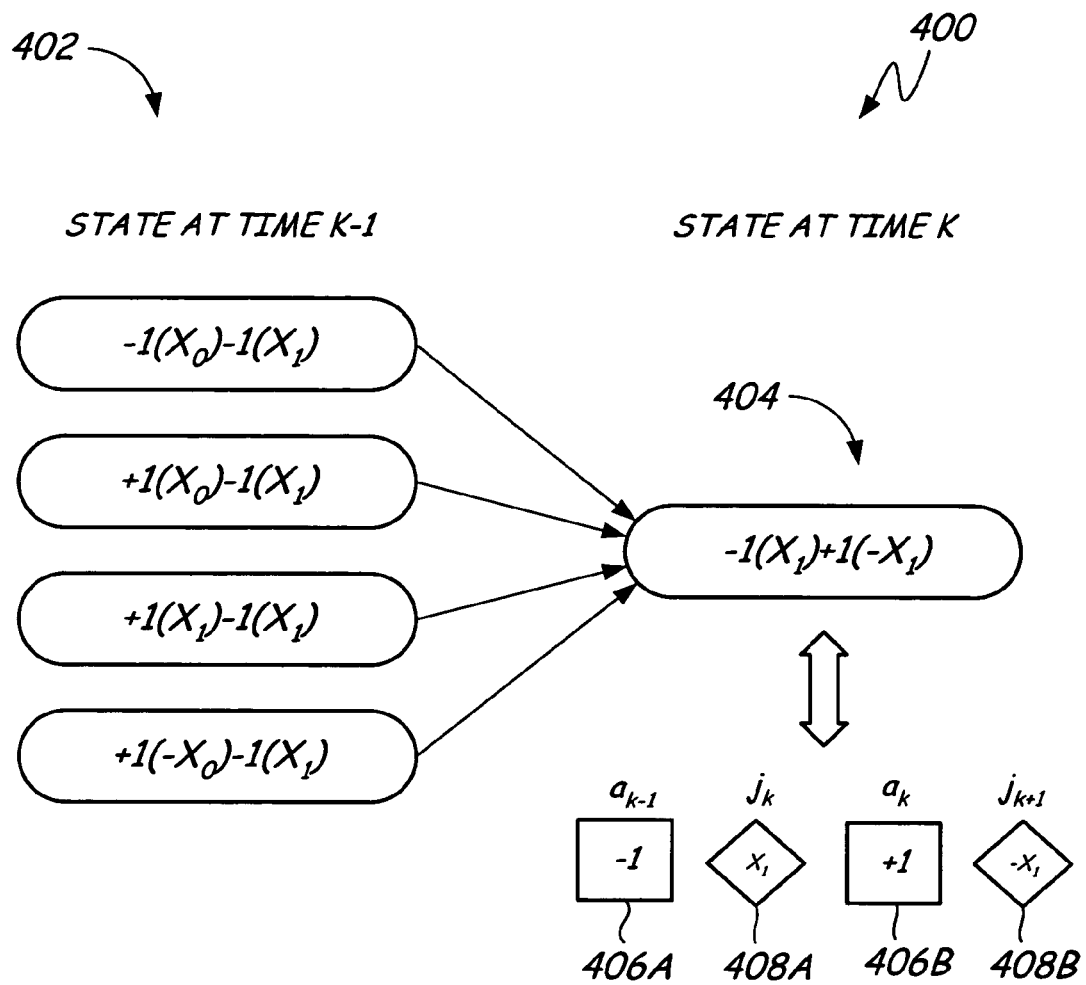
FIG. 4 is a simplified block diagram illustrating incoming transition branches to a state comprised of bits and jitter information according to an embodiment of the present invention.

FIG. 4 illustrates a simplified block diagram of one possible state trellis structure 400 for a portion of the trellis according to an embodiment of the present invention. Trellis structure 400 represents the bit states of a single bit at time K—1 and at time K, assuming that the target length is 3. The structure 400 has four incoming branches 402. The desired signal from each incoming branch can then be calculated as discussed above. The a-priori probability information for the transition jitter is taken into account during branch metric calculation, resulting in the probable state 404 at time K. Each state 402 and 404 contains two bits and two anchor points. The state 404 at time K is associated with two memory cells 406A and 406B for the bit information and two memory cells 408A and 408B for the jitter information (at time K).

At time K—1, the bit information and jitter information can be in any one of four states 402. In this instance, three anchor points are used, that is, m=1. A single state 404 at time k has at most (2m+1)+1 possible incoming branches, corresponding to different bit values for $a_{k-2}$ and for anchor point for $j_{k-1}$. If $a_{k-2} = a_{k-1}$, $j_{k-1}$ is equal to zero, since there is no transition. Otherwise, jitter information bit ($j_{k-1}$) can be any of the 2m+1 bit values.

In general, the state is represented as by a set of bits $a_{k-1}a_k$ and anchor points $j_k j_{k+1}$ in the form of $a_{k-1}(j_k)a_k(j_{k+1})$, where the jitter states are in parenthesis to distinguish them from the bit states. While calculating the branch metric, the a-priori probability information for the transition jitter $P(j_k|a_{k-1}a_k)$ thus is taken into account during branch metric computation.

Though equalization techniques are often employed prior to data detection to reduce ISI noise and trellis complexity, the equalizer also correlates the wide-band electronics noise, due to spectrum shaping by the equalizer, and the jitter noise. Noise predictive detection can be used to account for noise correlation seen by the detector, so that performance degradation due to noise correlation in the detector can be minimized.

Figure 5:
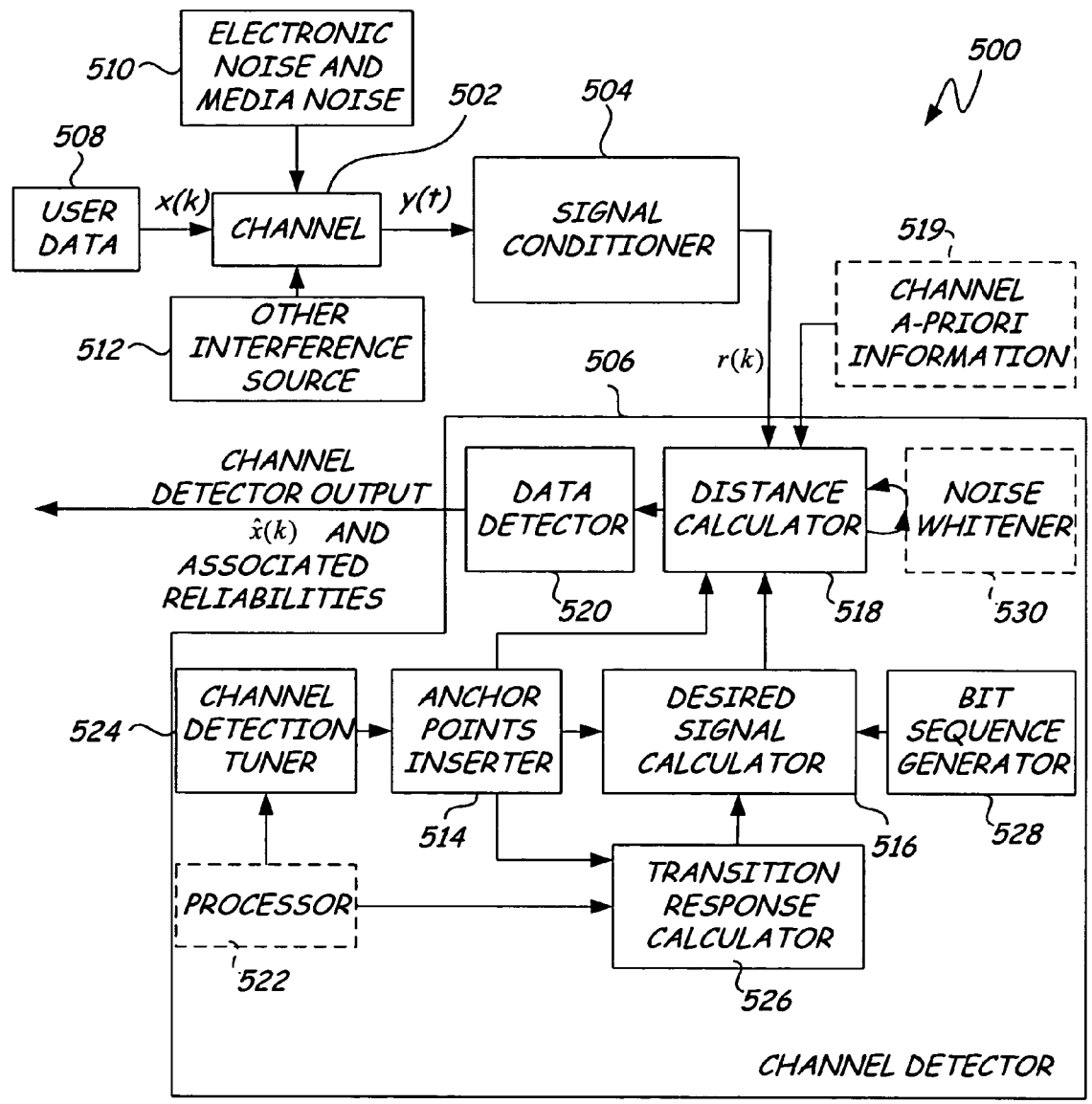
FIG. 5 is a simplified block diagram of a system for detecting information from a channel according to an embodiment of the present invention.

FIG. 5 is a simplified block diagram of a signal detection system 500 according to one possible embodiment of the present invention. The system 500 generally includes a channel 502, a signal conditioner 504, and a channel detector 506. In one embodiment, the channel 502 is a magnetic recording channel where data are stored in a storage medium and are later retrieved using a read-write mechanism.

User data 508 x(k) are sent through the channel 502. During the transmission process, electronics and media noise 510 and other interference sources 512, such as non-linearity, corrupt the signal. The signal corruption results in a received noisy signal y(t). The received signal y(t) is processed by the signal conditioner 504, which typically includes a low pass filter, a timing recovery circuit and a channel equalizer. Finally, the conditioned signal r(k) is input to the channel detector 506. Optionally, channel a-priori information 519 can also be input to the channel detector 506.

The channel detector 506 includes an anchor points inserter 514, a desired signal calculator 516, a distance calculator 518, and a Data Detector 520. The channel detector 506 can also include a processor 522, a channel detection tuner 524, a transition response calculator 526, a bit sequence generator 528, and a noise whitener 530.

The Data Detector 520 uses information from the distance calculator 518 to determine the output bit sequence x̂(k). The output bit sequence x̂(k) is determined by choosing a bit sequence corresponding to a desired signal which has the minimum distance from the received signal r(k). Optionally, the Data Detector 520 can also provide reliability information on the output bits x̂(k), in the same manner as the BCJR algorithm and soft-output Viterbi algorithm (SOVA) based on the distance computed by the distance calculator 518.

The distance calculator 518 computes a distance using anchor points a-priori information from the anchor points inserter 514, desired signal information from the desired signal calculator 516, the received signal r(k), and optionally channel a-priori information 519 and whitened noise from the noise whitener. The distance calculator 518 computes the distance (such as a squared Euclidean distance) between the received signal r(k) and the desired signal from the desired signal calculator 516. During the distance computation process, the distance calculator 518 can optionally use a-priori information regarding the anchor points from the anchor points inserter 514, as well as a-priori channel information 519, if there is any available. A-priori channel information is available, for example, in iterative decoding channels (such as Turbo-coded channels) beginning with the second channel decoding iteration.

The anchor points inserter 514 is adapted to choose exact values of each nominal (expected) transition point associated with a transition contained in the received signal r(k) and to provide a-priori information for the corresponding anchor-point values to the distance calculator 518. The anchor points inserter 514 also provides the chosen exact values of each nominal transition point to the desired signal calculator 516 and to the transition response calculator 526.

The desired signal calculator 516 computes a desired signal (or nominal signal) corresponding to jitter information obtained from the anchor points inserter 514, transition responses from the transition response calculator 526, and binary bit sequences from the bit sequence generator 528.

The transition response calculator 526 computes transition responses of the channel 502 corresponding to the anchor-point values set by the anchor points inserter 514. Specifically, if the channel transition response is f(t) and the anchor-points are −z, 0, and z, then the transition response calculator 526 provides discrete-time values for functions f(t+z),f(t) and f(t−z) to the desired signal calculator. These functions correspond to different nominal transition shifts, or anchor-point values −z, 0, and z, respectively.

The bit sequence generator 528 is adapted to generate all combinations of binary sequences for a sequence length up to the number of data bits need to be detected. For example, if 100 bits are to be detected from the received signal, the bit sequence generator 528 can generate all $2^{100}$ possible binary sequences of length 100. However, in practice, the number of different binary sequences required is considerably reduced by using, for example, a Viterbi-like algorithm, which eliminates a majority of binary sequences during the competition process.

An optional processor 522 collects information regarding the channel 502, such as signal to noise ratio (SNR), detection bit error rate (BER), equalizer target, equalizer SNR, and the like. The optional processor 522 can send appropriate information to a channel detection tuner 524 and to the transition response calculator 526.

The channel detection tuner 524 monitors the performance and/or parameters of the channel detector 506 and adaptively sets anchor-point values and subdivides the bit interval used by the detector 506 into sub-intervals. Each sub-interval contains one anchor-point. For example, the channel detection tuner 524 can be adapted to monitor a bit error rate of the channel detector 506 or of the data detector 520 and responsively to adjust the anchor points to improve the channel detector performance.

The optional noise whitener 530 can be embedded into the distance calculator 518 to adjust for correlated noise in the received signal r(k). The noise whitener 530 effectively eliminates the correlation between successive noise samples during the distance computation process, hence providing more accurate results for decoding.

Once the received signal r(k) is input to the channel detector 506, the distance calculator 518 uses the desired signal from the desired signal calculator 516 and the whitened noise from the noise whitener 530 to calculate a distance between the received signal r(k) and desired signal. The distance calculator 518 can also use anchor points a-priori information from the anchor points inserter 514 as well as channel a-priori information 519. The computed distance is then input to the data detector 520, which generates the channel detector output.

In general, it should be understood that the channel detector could be implemented in a variety of ways. Preferably, the channel detection scheme takes into account the jitter noise as a separate noise component, rather than lumping jitter noise together with other noise sources. The present invention accounts for jitter noise by inserting anchor points and calculating the bit probabilities based on the closest anchor point, rather than over the entire bit interval. Thus, the jitter noise is reduced, with a slight increase in computation complexity. Preferably, the selected number of anchor points added to subdivide the bit interval does not degrade overall channel detector performance.

Additionally, the data detector 520 and distance calculator 518 can be implemented using a variety data detection algorithms. In a preferred embodiment, the data detector 520 is a maximum a-posteriori probability sequence detector. In an alternative embodiment, the data detector 520 is a maximum-likelihood sequence detector with soft-output, such as a soft-input soft-output Viterbi decoder. In yet another alternative embodiment, the data detector 520 is maximum a-posteriori probability detector, such as a BCJR detector. Other types of detectors can also be utilized provided the detector is adapted to take into account the anchor points information.

By utilizing anchor points and their associated a-priori information for the transition jitter, additional gains can be achieved over conventional detectors, such as generalized partial response channel (G-PRML) detectors or pattern-dependent noise predictive detectors. By comparing the performance of various detectors against the same channel, the performance gains become evident.

Assuming a perpendicular recording channel operating at a normalized linear density 2.5, the transition response of the channel is given by the following error function:

$$h(t) = V_p \mathrm{erf}\left(\frac{2\sqrt{\ln 2}}{D_u}t\right) \quad \text{(Equation 16)}$$

where $D_u$ is the normalized linear density and $V_p$ is the peak amplitude of an isolated transition. Assuming the peak amplitude of $V_p$ is approximately 0.6134 V, the energy of the derivative of h(t) is 1. The signal to noise ratio is defined as follows:

$$SNR = \frac{E_i}{N_0 + M_0}, \quad \text{(Equation 17)}$$

where $E_i$ is the energy of the derivative of the transition response (which is equal to 1 in our case), $N_0$ is the single side power-spectrum density height of the electronics noise, and the jitter noise $M_0$ is defined as shown in Equation 4 above.

Figure 6:
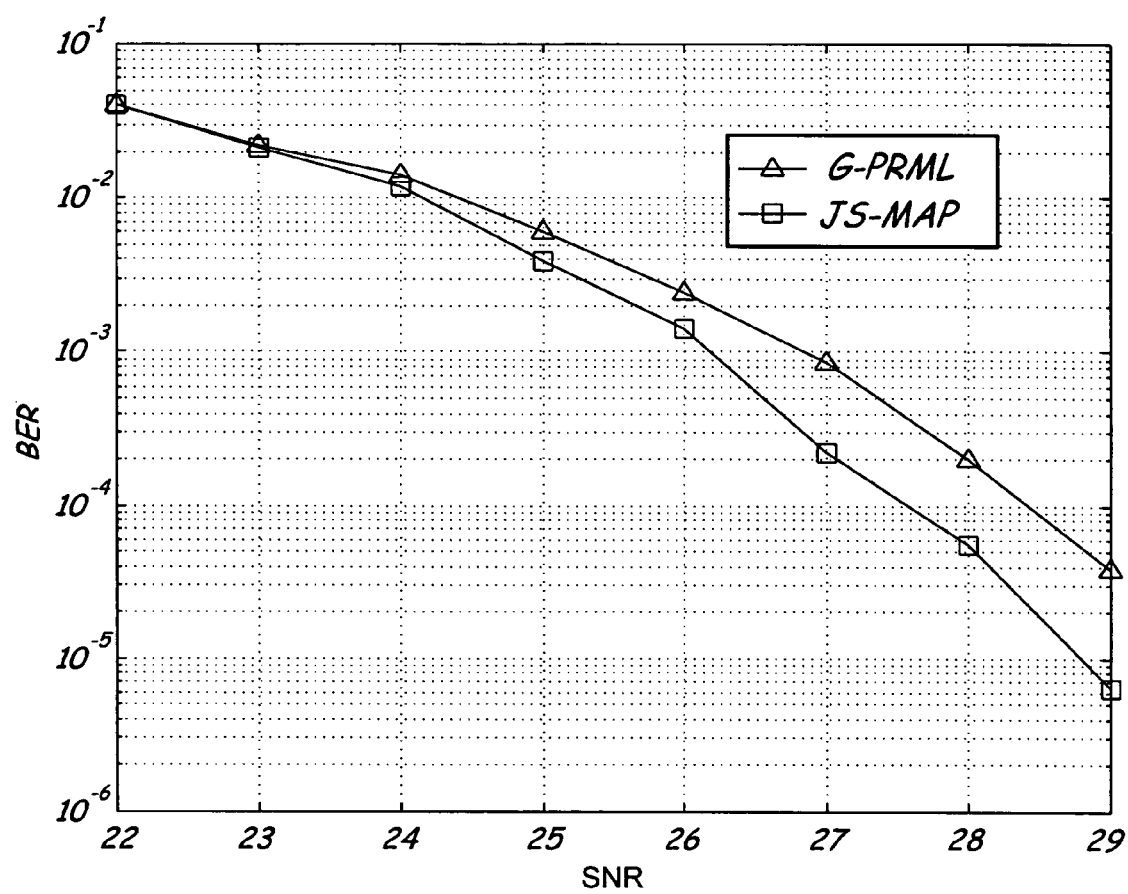
FIG. 6 is a log graph of signal-to-noise ratio (SNR) versus bit error rate (BER) for jitter sensitive maximum-a-priori (MAP) detection with generalized partial response target of length 4.

FIG. 6 is a graph illustrating BER versus SNR of a JS-MAP detector compared with a G-PRML system when ninety percent jitter noise and ten percent electronics noise are present in the system. Denoting the power spectrum density height of electronics noise (single-sided) by $N_0$, the jitter noise percentage is calculated as follows:

$$\frac{M_0}{N_0 + M_0} = 0.9 \qquad \text{(Equation 15)}$$

Both the JS-MAP detector and the G-PRML detector share the same target, which is designed according to the minimum mean square error (MMSE) criteria, using a monic constraint. A fifty-one tap transversal linear filter is used as the equalizer. The equalizer target length is four. Three anchor points were used at points −0.13, 0, and 0.13, relative to time T. The associated a-priori probabilities are computed at different SNRs according to equation 9 above. The transition jitter $\Delta_k$ is assumed to be independent and identically distributed (i.i.d.) Gaussian jitter noise with a cut-off limit of half of the bit interval T.

In the trellis construction, the bit memory is three, and the jitter memory length is also three. The detailed structure is similar to that shown in FIG. 4, except that two additional memory cells are added (one for the bit state $a_{k-2}$, and one for the jitter state $j_{k-1}$) since the target length is four.

As can be seen from the graph, a JS-MAP detector outperforms a G-PRML system, particularly as the SNR increases. At SNR equal to 22 on a linear scale, the G-PRML and JS-MAP detectors both have a bit error rate of about 4.0×10⁻². At SNR equal to 25, the JS-MAP detector outperforms the G-PRML detector. However, it should be noted that the performance gains also correspond to an increase in complexity. For example, the JS-MAP detector uses 96 states, while the G-PRML detector uses only 8 states.

Since jitter noise is correlated with the data bits, using pattern (or data) dependent noise whitening (or prediction) filters can provide additional gains. The mechanism of the pattern dependent noise prediction (PDNP) is that certain bit patterns, such as "0101", contain more transitions than other bit patterns, such as "0000" or "1111". Thus, the noise correlation structure corresponding to different bit patterns are different. PDNP detectors exploit this fact and use different noise whitening filters for different data patterns. Since the transition jitter is explicitly built into the Viterbi trellis of the present invention, the noise predictors can be conditioned on the jitter state, the bit state, or both, depending on the channel operating conditions and desired detection performance.

For training of noise predictors, the noise sequence is computed as seen by the JS-MAP detector. Thus, the data bits, the anchor points, as well as the actual transition jitter are provided to the training module such that they are taken into account during the noise calculation. Consequently, the noise predictors of the present invention differ from conventional noise predictors which operate on transition noise and electronics noise with much larger variance.

Figure 7:
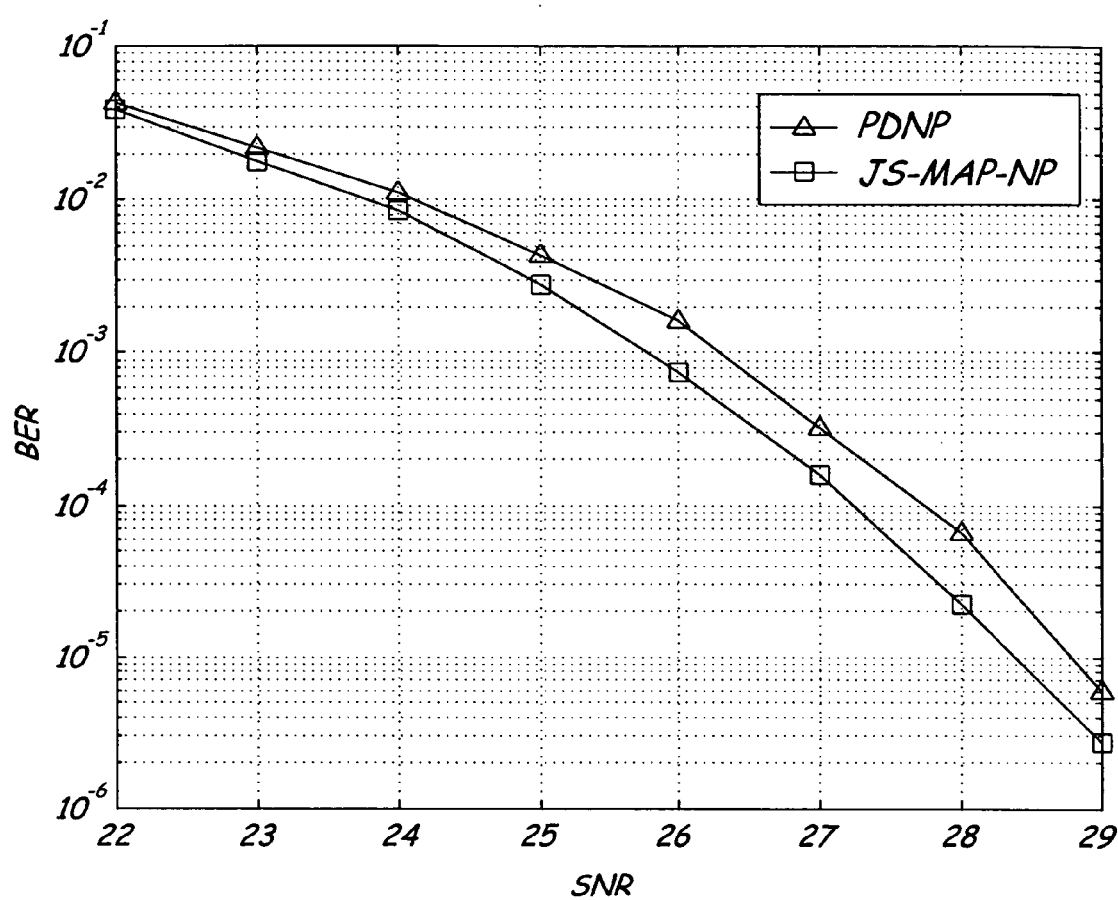
FIG. 7 is a log graph of signal-to-noise ratio versus bit error rate for a detector using jitter sensitive maximum-a-priori (MAP) detection with noise prediction detection embedded for perpendicular recording channels of 90% transition jitter noise.

FIG. 7 illustrates a graph of BER versus SNR for a JS-MAP detector with embedded noise predictive detection. For the purposes of this graph, the noise predictors vary from one jitter pattern to another, and a total of twenty-seven different noise predictor are used. The noise predictor length is five, and the decision feedback length is three. The equalization target is three as well. Consequently, the number of states that is required for the noise prediction embedded JS-MAP detector is forty-eight states. The performance of the NP-JS-MAP detector is graphed against a pattern-dependent noise prediction (PDNP) detector. The PDNP detector utilizes sixteen predictors and a feedback depth of two. The PDNP uses 32 states. The normalized density for the channel is 2.5 with 90 percent jitter noise. The JS-MAP detector outperformed the PDNP detector consistently.

Figure 8:
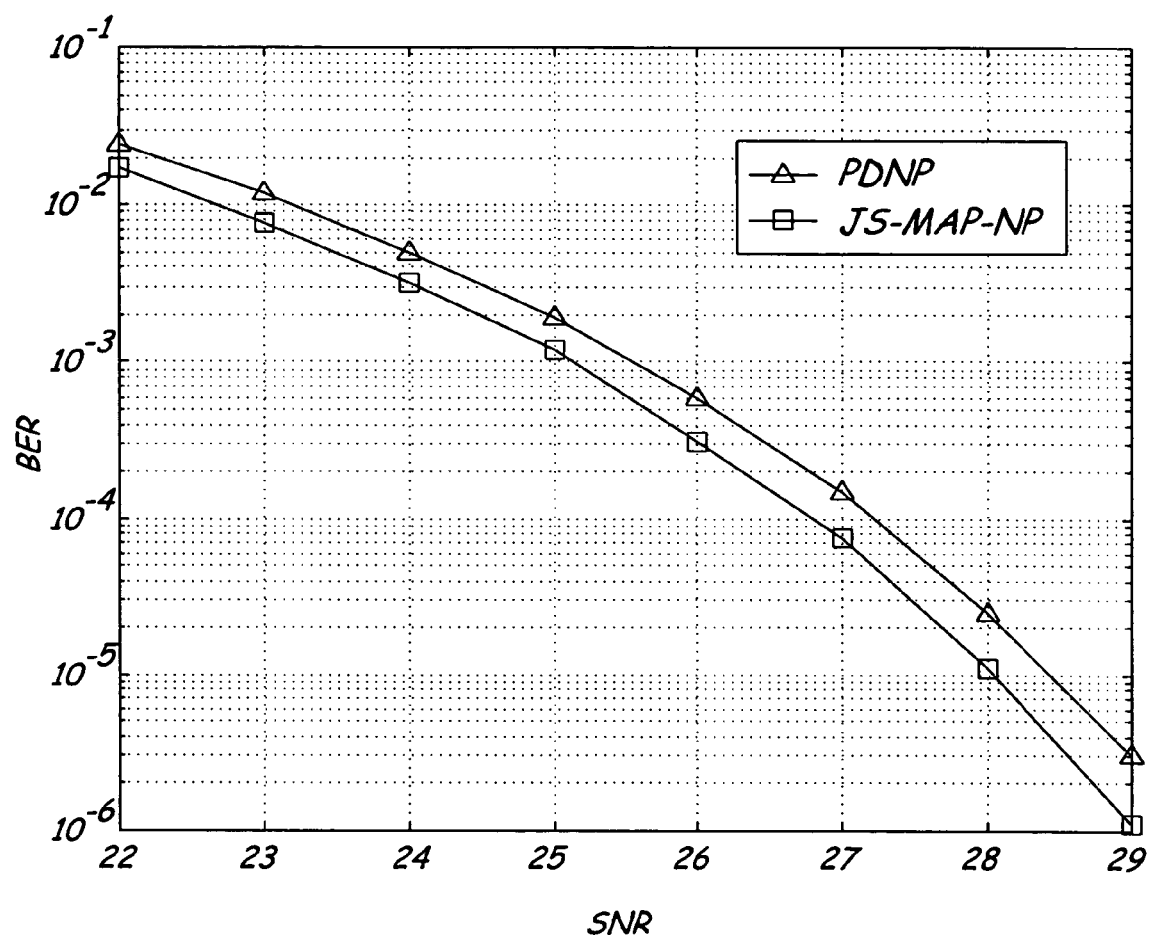
FIG. 8 is a log graph of signal-to-noise ratio versus bit error rate for detector having jitter sensitive maximum-a-priori detection with noise prediction detection embedded for longitudinal recording channel of approximately 90% transition jitter noise.

FIG. 8 illustrates a graph of BER versus SNR for a JS-MAP detector with embedded noise prediction and for a PDNP detector on a longitudinal recording channel with 90% jitter noise. The transition response of the channel is modeled as a Lorentzian pulse, which is an effective model of the transition response in a longitudinal recording channel. The Lorentzian pulse represents the voltage response at the output of a read head of a magnetic storage device in response to an isolated transition on the media, which can be modeled by the following equation:

$$v(t) = \frac{1}{1 + \left(\frac{2t}{x}\right)^2}. \qquad \text{(Equation 18)}$$

In Equation 18, variable (t) represents time, and variable (x) is used to control the pulse width.

The normalized density of the channel is 3.0 and 90 percent transition jitter noise is present. Once again, the JS-MAP detector outperforms the PDNP detector, consistently.

In general, the present invention introduces a jitter-sensitive maximum a-posteriori probability sequence detector adapted to exploit a-priori information about the transition jitter and the structure of the resulting jitter noise, by introducing anchor points to account for the random transition shift. The additional anchor points reduce the noise seen by the detector. Since the gains force the detector to distinguish closer transition response signals, the number of anchor points should be carefully selected to avoid offsetting detection gains with performance degradation. However, moderate performance improvement over conventional detection schemes is possible with a slightly increased complexity when jitter noise is the dominant noise source.

While the above discussion has largely focused on storage device implementations of the invention, it should be understood that the present invention is applicable to any type of system adapted to detect data on a communications channel, particularly where jitter noise is present. Additionally, it should be understood that the present invention can be implemented in hardware, in software, or in a combination of hardware and software. Moreover, though the figures presented features of the present invention as separate blocks, some of the features may share circuitry or software, and various features may be combined, depending on the specific implementation.

The systems and methods of the present invention are applicable to hard-decision channel detectors, such as Viterbi-like channel detectors that generate outputs of zeros and ones. The systems and methods of the present invention are also applicable to soft-decision channel detectors, such as detectors using soft-output Viterbi algorithm (SOVA), Bahl, Cocke, Jelinek and Raviv (BCJR) algorithm, and the like. Viterbi detectors, SOVA detectors, and BCJR detectors are known in the art. In general, the present invention can be used with any channel detector that outputs reliability information associated with the binary decisions.

It is to be understood that even though numerous characteristics and advantages of various embodiments of the invention have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular application for the jitter-sensitive channel detection system while maintaining substantially the same functionality without departing from the scope and spirit of the present invention. In addition, although the preferred embodiment described herein is directed to a jitter-sensitive maximum a-posteriori probability channel detection system for data detection on channels where jitter noise constitutes a dominant noise source, it will be appreciated by those skilled in the art that the teachings of the present invention can be applied to any type of storage device or data reception device and to JS-MAP channel detection system with noise prediction, without departing from the scope and spirit of the present invention.

What is claimed is:

1. A channel detector comprising:
    an anchor points inserter adapted to choose values of expected transition locations for transition shifts within a received signal and to insert anchor points corresponding to the chosen values within a bit detection interval;
    a desired signal calculator coupled to the anchor points inserter and adapted to estimate desired signals corresponding to transition location information from the anchor points inserter;
    a distance calculator coupled to the desired signal calculator and adapted to generate a distance calculator output based on distances between the received signal and each of the desired signals; and
    a data detector coupled to the distance calculator, the data detector adapted to identify a bit sequence corresponding to a desired signal having a minimum distance from the received signal and to generate an output based on the distance calculator output.

2. The channel detector of claim 1 wherein the output of the data detector comprises a soft information output generated by the data detector using a maximum-likelihood algorithm or a maximum a-posteriori probability algorithm.

3. The channel detector of claim 1 further comprising:
    a channel detection tuner adapted to monitor performance parameters of the data detector and to sub-divide the bit detection interval into sub-intervals, wherein each sub-interval contains one anchor point.

4. The channel detector of claim 1 further comprising:
    a transition response calculator adapted to calculate discrete time transition responses of the channel corresponding to the values of the anchor points set by the anchor points inserter.

5. The channel detector of claim 1 further comprising:
    a bit sequence generator adapted to generate possible bit sequences up to a number of bits to be detected for use by the desired signal calculator in estimating desired signals.

6. The channel detector of claim 1 further comprising:
    a noise whitener coupled to the distance calculator and adapted to eliminate correlations between successive residual noise samples.

7. The channel detector of claim 1 wherein the distance calculator is adapted to use anchor points a-priori information from the anchor points inserter and available channel a-priori information to calculate the distance.

8. The channel detector of claim 1 wherein the data detector comprises a maximum-likelihood sequence detector with soft-output.

9. The channel detector of claim 1 wherein the data detector comprises a maximum a-posteriori probability detector.

10. A method for detecting a signal from a channel with jitter noise comprising:
    inserting anchor points into a bit detection interval using an anchor points inserter, the anchor points to subdivide the bit detection interval at expected transition locations within a received signal;
    calculating discrete-time transition responses from the channel corresponding to the inserted anchor points using a transition response calculator;
    generating possible bit sequences having a length up to a number of data bits to be detected from the channel using a bit sequence generator;
    calculating nominal signals with a desired signal calculator, the nominal signals corresponding to transition location information from the anchor points inserter, calculated transition responses from the transition calculator, and the possible bit sequences from the bit sequence generator;
    detecting an output bit sequence based on a nominal signal that has a minimum distance from the received signal from the channel using a data detector; and
    generating a reliability information output based on the distance information provided by the distance calculator.

11. The method of claim 10 wherein the step of inserting comprises:
    choosing anchor point values corresponding to expected transition locations for transitions within the received signal; and
    inserting the anchor points into the bit detection interval according to the chosen anchor point values.

12. The method of claim 10 wherein before the step of detecting, the method further comprises:
    calculating a distance between the received signal from the channel and nominal signals from the desired signal calculator using a distance calculator; and
    identifying a nominal signal having a minimum distance from the signal received from the channel.

13. The method of claim 12 wherein the distance calculator is adapted to use a-priori information regarding the anchor points from the anchor points inserter and a-priori channel information during the calculating step, if the a-priori information is available.

14. The method of claim 12 wherein the step of generating reliability information comprises:
    obtaining distance information for each candidate nominal signal relative to the received signal; and
    calculating a reliability information of an output bit sequence representative of a nominal signal having a minimum distance from the received signal using a soft-output Viterbi algorithm (SOVA).

15. The method of claim 12 wherein the step of generating the reliability information further comprises:
    calculating a log-likelihood ratio output based on the distance information from the distance calculator using a maximum a-posteriori probability detector.

16. A channel detector comprising:
    an anchor points inserter adapted to insert anchor points into a bit detection interval, the anchor points corresponding to values of expected transition locations for transition shifts within received signals;

a bit generator adapted to generate possible bit sequences having a length corresponding to a number of bits to be detected;

a signal calculator coupled to the anchor points inserter and to the bit sequence generator, the signal calculator adapted to calculate nominal signals based on the possible bit sequences and on information from the anchor points inserter; and a data detector coupled to a channel and adapted to receive a signal, the data detector adapted to identify a bit sequence corresponding to a nominal signal having a minimum distance from the received signal, the data detector adapted to generate a soft reliability information output based on the received signal using a maximum-likelihood or a maximum a-posteriori probability algorithm.

17. The data detector of claim 16 further comprising:
a distance calculator coupled to the signal calculator and adapted to calculate a distances between received signals and each of desired signals, wherein the soft reliability information output is calculated from the calculated distance.

18. The data detector of claim 16 wherein the maximum a-posteriori probability algorithm comprises a BCJR algorithm.

19. The data detector of claim 16 wherein the maximum-likelihood probability algorithm comprises a SOVA algorithm.

20. The data detector of claim 17 wherein the data detector generates reliability information from the calculated distances based on the maximum likelihood or the maximum a-posteriori algorithm.

* * * * *

UNITED STATES PATENT AND TRADEMARK OFFICE
CERTIFICATE OF CORRECTION

PATENT NO. : 7,424,077 B2  
APPLICATION NO. : 11/105008  
DATED : September 9, 2009  
INVENTOR(S) : Yang et al.

Page 1 of 1

It is certified that error appears in the above-identified patent and that said Letters Patent is hereby corrected as shown below:

At column 7, replace Equation 13 with the following equation:

$$P\{j_k = x_i | a\} = P_i, i = -m,...,m, \text{ if } a_{k-1} \neq a_k.$$

Signed and Sealed this

Fifteenth Day of September, 2009

David J. Kappos  
*Director of the United States Patent and Trademark Office*